United States Patent
Yamazaki et al.

[11] Patent Number: 5,983,033
[45] Date of Patent: Nov. 9, 1999

[54] LENS BARREL

[75] Inventors: Yasuo Yamazaki; Yasunari Shimazaki, both of Hino; Shigeo Hayashi, Okaya, all of Japan

[73] Assignee: Olympus Optical Co., Ltd., Tokyo, Japan

[21] Appl. No.: 09/140,277

[22] Filed: Aug. 26, 1998

[30] Foreign Application Priority Data

Aug. 27, 1997 [JP] Japan .................................. 9-231437

[51] Int. Cl.$^6$ .................................................. G03B 17/04
[52] U.S. Cl. .............................................. 396/85; 396/349
[58] Field of Search .............................. 396/85, 72, 349

[56] References Cited

U.S. PATENT DOCUMENTS 5,652,922 7/1997 Kohno ................................. 396/349 X

FOREIGN PATENT DOCUMENTS 7-027963 1/1995 Japan .
8-313788 11/1996 Japan .

*Primary Examiner*—W. B. Perkey
*Attorney, Agent, or Firm*—Louis Weinstein

[57] ABSTRACT

A lens barrel permits easier switching of an extending operation between a setup operating region, which begins at a collapsed position where the lens frame of the lens barrel is retracted, and a zooming region, and accordingly provides a simpler mechanism. In the setup operation, a setting gear is driven to extend a setting frame, a float key, and a moving frame so as to extend a first group zoom frame retained on a cam frame and a second lens holding frame from a collapsed position to a photographing standby position. In the zooming operation, a zoom gear is driven to rotationally drive the moving frame so as to adjust the first group zoom frame and the second lens holding frame.

24 Claims, 12 Drawing Sheets

LENS BARREL

BACKGROUND OF THE INVENTION

1. Field of the Invention

The present invention relates to a mechanism for extending a lens barrel in an optical system.

2. Description of the Related Art

In a conventional a multi-stage zoom lens barrel structure proposed in Japanese Unexamined Patent Publication No. 7-27963, a zoom lens barrel has a three-stage extending mechanism, and a fixed barrel cylinder is disposed on the outermost circumference; an inner frame is moved by a gear from a collapsed position to a wide angle position through a telephoto angle position, which are photographing standby positions, thereby to perform zooming.

According to another structure disclosed in Japanese Unexamined Patent Publication No. 8-313788, a feed screw connected to a driving system is used to move the lens barrel from the collapsed position to a setup position which enables photographing, then a rotary frame that has a gear on the outer periphery thereof is turned to carry out zooming, the gear being connected to the driving system.

The structure disclosed in Japanese Unexamined Patent Publication No. 7-27963 has a shortcoming in that, since the lens frame is moved from the collapsed position to the wide angle position through the telephoto angle position by a single cam, the lead angle of the cam increases as the extending amount is increased and the load becomes heavier.

The structure disclosed in Japanese Unexamined Patent Publication No. 8-313788 is disadvantageous in that switching between the drive of the setup feed screw and the drive for zooming must be performed using an electromagnet according to the detection output indicative of the position of the lens frame given by a position detecting sensor so as to avoid a timing problem. This has resulted in a complicated switching system and a longer switching time. Furthermore, preventive measures must be provided against the leakage of light rays at the time of setup.

SUMMARY OF THE INVENTION

Accordingly, the present invention has been made with a view toward solving the problems described above, and it is an object thereof to provide a zoom lens barrel that permits easy switching of the extending operation between a setup operating region and a zoom region, and that also has a simpler mechanism constitution. The setup operating region extends from the position where the lens frame of a lens barrel is retracted to a photographing standby position.

To this end, according to the present invention, there is provided a lens barrel for a photographing optical system that is telescopically moved between a collapsed position where it is retracted with respect to the main body of a camera and a photographing standby position where the lens barrel is moved forward from the collapsed position, the lens barrel including: a setting frame which rotates substantially around the optical axis of the photographing optical system to move the photographing optical system between the collapsed position and the photographing standby position; a moving frame which rotates substantially around the optical axis of the photographing optical system to move the photographing optical system so as to change the focal length thereof; a setting gear which meshes with a gear assembly provided on the setting frame to rotate the setting frame; and a zoom gear meshed with a gear assembly provided on the moving frame to rotate the moving frame.

In the lens barrel, the photographing optical system is driven forward or backward between the collapsed position and the photographing standby position via the setting gear. The photographing optical system is further driven forward or backward via the zoom gear to change the focal length.

Other features and advantages of the present invention will become more apparent in the following description.

DESCRIPTION OF THE PREFERRED EMBODIMENTS

Figure 1:
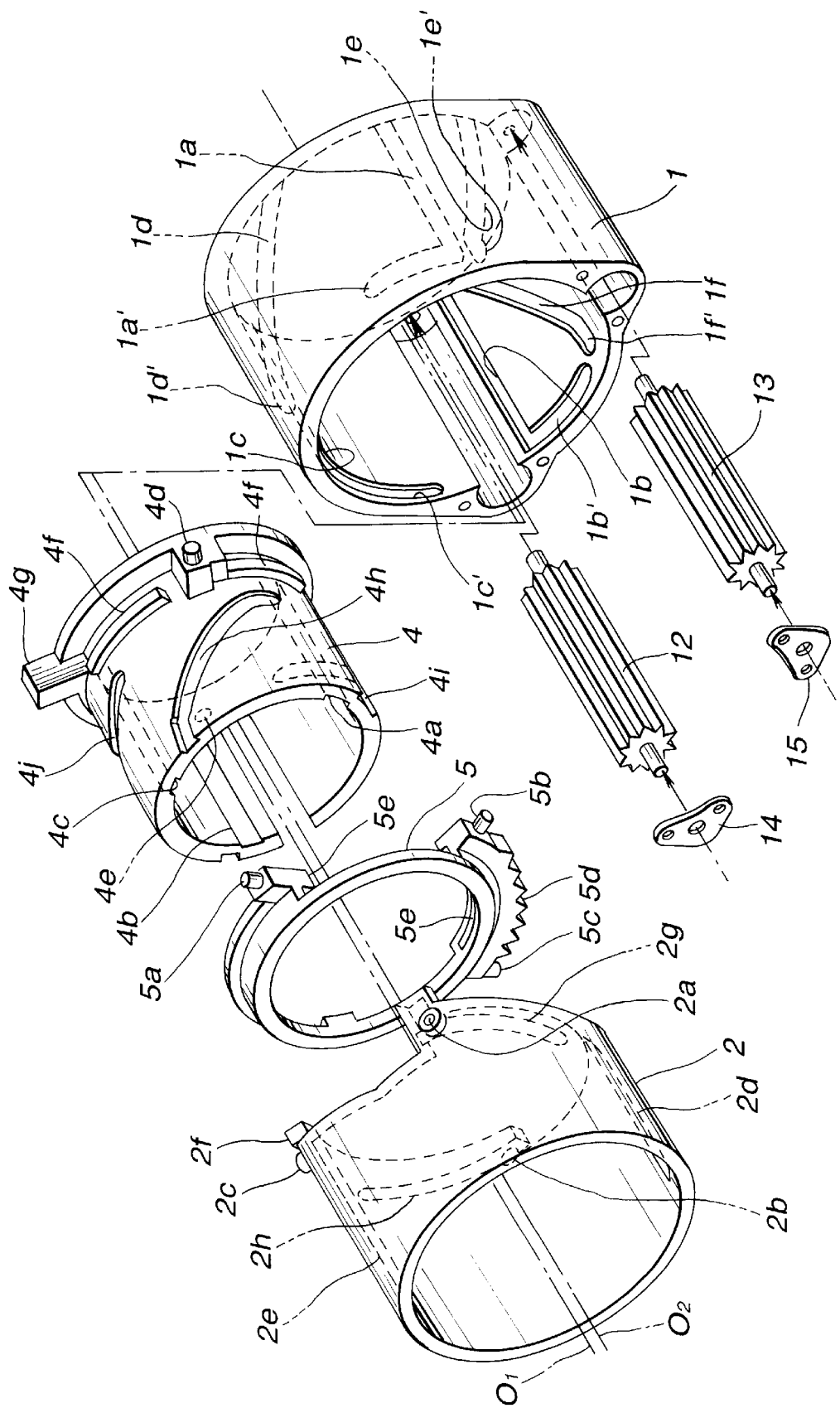
FIG. 1 and FIG. 2 are assembly views illustrating a part of a zoom lens barrel that is the lens barrel of a first embodiment in accordance with the present invention.

Embodiments of the present invention will be described in conjunction with the accompanying drawings.

Referring to FIGS. 1 to 11, a zoom lens barrel that is the lens barrel of a first embodiment of the present invention will be described. In the drawings, reference numeral O1 denotes the optical axis of the lens and reference numeral O2 denotes the central axis of the lens barrel assembly.

The zoom lens barrel of this embodiment is constituted by the members related to a moving frame and the members related to a cam frame. The members related to the moving frame include: a fixed frame 1 which is supported by being secured mostly to a camera main body or the like; a moving frame 2 which is movable toward or away from the fixed frame 1 and also is designed to rotate; a float key 4 which is guided by the fixed frame 1 and driven forward or backward integrally with the moving frame 2 without rotating; a setting frame 5 which is free to rotate in either direction with respect to the float key 4 and which is driven forward or backward integrally and simultaneously, while being guided as to whether it should move forward or backward; a setting gear 13 which is driven via a camera driving unit and which is a first gear for rotationally driving the setting frame 5; and a zoom gear 12 which is drive n via the camera driving unit and which is a second gear for rotationally driving the moving frame 2 as shown in FIG. 1. The moving frame 2 is able to move forward or backward between a collapsed position where it is retracted in the fixed frame 1 and a photographing standby position which is a setup position; it is also circularly driven at the time of zooming.

Figure 2:
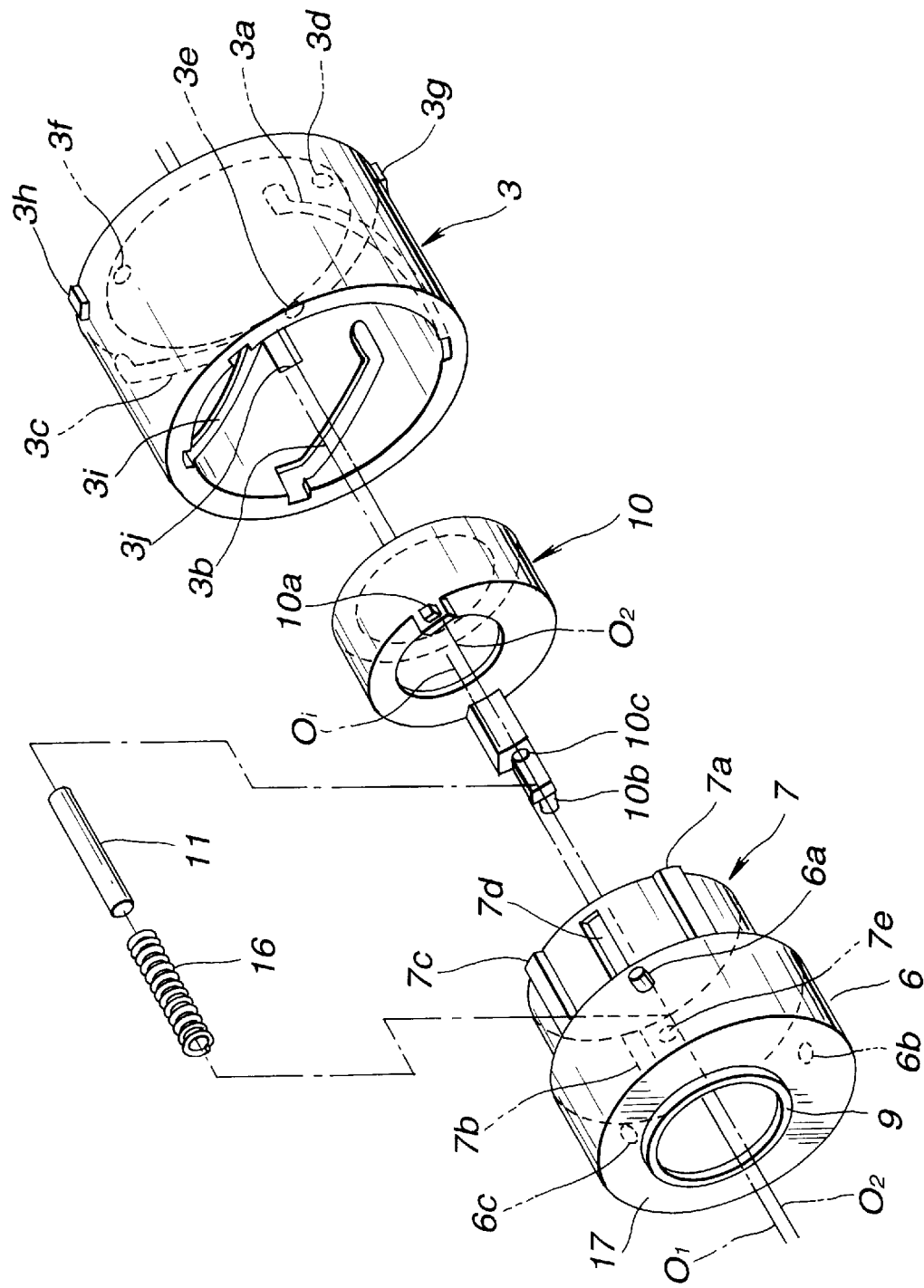

The members related to the cam frame of the zoom lens barrel includes: a cam frame 3 which is guided as to the rotational direction mainly by the moving frame 2 and driven forward or backward by the cam of the float key 4; a first group zoom frame (hereinafter referred to as "1Z frame") 6 which is guided by the float key 4 as to the rotational direction and driven forward or backward by the cam of the cam frame 3; a shutter main body (hereinafter referred to as "S main body") 7 which is driven forward or backward integrally with the 1Z frame 6 and guided by the float key 4 as to the rotational direction to consequently restrict the rotation of the 1Z frame; a first group lens holding frame (hereinafter referred to as "1G frame") 9 which is supported by the 1Z frame 6 and which serves as a first lens holding frame that supports the first group lens serving as the photographing lens; and a second group lens holding frame (hereinafter referred to as "2G frame") 10 which is slidably supported by the S main body 7 and driven forward or backward by the cam of the cam frame 3 and which serves as a second lens holding frame that supports a second group lens functioning as a photographing lens as shown in FIG. 2.

The zoom lens barrel having the constitution set forth above will now be described in more detail. The operation, in which the setting frame 5 is rotated to extend the moving frame 2 from the position where it is retracted to the position where it is extended and is in a wide angle state and ready for photographing, is defined as a setup operation. Conversely, the operation in which the moving frame 2 is retreated from the extended position back to the collapsed position is defined as a setdown operation. Setting operation includes both setup operation and setdown operation described above. The operation in which the moving frame 2 is rotated to zoom from the wide angle state to the telephoto angle state is defined as zoom-in operation, while the operation in which the moving frame 2 is rotated to zoom from the telephoto angle state to the wide angle state is defined as a zoom-out operation. Zooming operation includes both zoom-in operation and the zoom-out operation described above.

Moving the moving frame 2 forward or backward between the collapsed position and the extended position for the setup or setdown operation is accomplished by driving the setting frame 5 forward or backward. More specifically, the setting gear 13 held by the fixed frame 1 shaped like a spur gear which extends in the axial direction to match the moving length of a setting region is rotated by the camera driving unit to move it along the optical axis by the cam of the fixed frame 1 while rotating the setting frame 5 gear-meshed with the setting gear 13. This drives the moving frame 2 forward or backward.

The moving frame 2 is rotated to carry out zooming as follows: the zoom gear 12 shaped like a spur gear which extends in the axial direction to match the setting region and which is held by the fixed frame 1 is rotated by the camera driving unit so as to rotate the moving frame 2 that is gear-meshed with the zoom gear 12.

The fixed frame 1 is provided with a bore at a predetermined position for retaining the setting gear 13 that rotates at the time of the setting operation. One shaft end of the setting gear 13 is engaged with the bore, while the other shaft end is engaged with a bore of a setting gear holder 15 which is positioned and secured to the fixed frame 1. The setting gear 13 has both shaft ends thereof supported as described above so that it may rotate in a predetermined position of the fixed frame 1.

Likewise, the zoom gear 12 that rotates to perform zooming has the shaft ends thereof supported in the shaft bores of a zoom gear holder 14 and the fixed frame 1, respectively, so that it may rotate in a predetermined position with respect to the fixed frame 1.

The fixed frame 1 is provided with moving frame keyways 1a, 1b, and 1c, and keyways 1a', 1b', and 1c'. The keyways 1a, 1b, and 1c are the grooves arranged parallel to the direction of an optical axis O; they form a setting region that restricts the rotational movement of the moving frame 2 when it moves forward or backward during the setting operation. The keyways 1a', 1b', and 1c' are provided adjacent to the setting region. These keyways are the grooves arranged perpendicularly to the optical axis O; they form a zooming region that restricts the forward or backward movement of the moving frame 2 when it is rotationally driven after completion of the setting.

The setting frame 5 is meshed with the setting gear 13 through a gear 5d, so that it rotates when the setting gear 13 is rotated by the camera driving unit. At this time, the setting frame 5 moves forward or backward as it rotates because cam followers 5a, 5b, and 5c of the setting frame 5 are engaged with setting frame cam grooves 1d, 1e, and 1f provided in the fixed frame 1.

The setting frame 5 is also engaged with the float key 4, and a bayonet receiver 5e is engaged with a bayonet ratchet 4f of the float key 4. Hence, the setting frame 5 can be rotated in either rotational direction, whereas it moves integrally with the float key 4 along the optical axis.

The float key 4 is restricted in rotation because a detent key 4g of its own is engaged with the keyway 1c of the fixed frame 1; it moves forward or backward by the action of the cam as the moving frame 2 rotates because cam followers 4d and 4e are engaged with float key cam grooves 2g and 2h of the moving frame 2.

The moving frame 2 is engaged with the fixed frame 1, and cam followers 2a, 2b, and 2c engage the moving frame keyways 1a, 1b, and 1c of the fixed frame 1. The moving frame 2 moves forward or backward with its rotation restricted by the setting region defined by the keyways during the setting operation, whereas it is rotationally driven with its forward or backward movement restricted by the zooming region of the key grooves after completion of the setting operation.

The cam frame 3 is engaged with the moving frame 2, and detent keys 3g and 3h are fitted in keyways 2d and 2e of the moving frame 2, so that the cam frame 3 rotates integrally with the moving frame 2 in the rotational direction, while it moves forward or backward along the optical axis O. Further, cam followers 3d, 3e, and 3f of the cam frame 3 are engaged with cam grooves 4h, 4i, and 4j of the float key 4;

therefore, when the cam frame 3 rotates, it moves forward or backward by the cam action of the float key 4 supported by the fixed frame 1 in such a manner that the rotation thereof is restricted.

The 1Z frame 6 is engaged with the cam frame 3, and cam followers 6a, 6b, and 6c are fitted in 1Z frame cam grooves 3a, 3b, and 3c of the cam frame 3. The S main body 7 is secured to the 1Z frame 6 by a screw as it will be discussed later. The S main body 7 is engaged with the float key 4 and it is provided with detent keys 7a, 7b, and 7c engaged with keyways 4a, 4b, and 4c of the float key 4. Thus, the S main body 7 moves forward or backward by the cam action effected by the rotation of the cam frame 3 while the rotation thereof is locked together with the 1Z frame 6 in relation to the float key 4.

The front of the 1Z frame 6 has three holes for mounting the S main body 7, the S main body 7 being fixed with screws. The front of the 1Z frame 6 is covered with a 1Z garnish 17 to cover up the screws.

The 1G frame 9 holds the first group lens and engages a support shaft (not shown) which is secured to the 1Z frame 6 and the S main body 7, and it is supported so that it may move forward or backward along the optical axis O. Focusing can be accomplished by a drive source (not shown).

A shutter vane is provided at the rear of the S main body 7 and the vane is retained by a vane holder 8. The shutter vane is driven by a drive source which is provided on the S main body 7 and which is not shown.

The second group lens is retained on the 2G frame 10, and a detent key 10a of the 2G frame 10 is fitted in a detent key groove 7d of the S main body 7. One end of a 2G shaft 11 is secured in a support hole 10c of the 2G frame 10, whereas the other end of the 2G shaft 11 is engaged with an engagement hole 7e of the S main body 7. Further, a 2G spring 16 is installed on the 2G shaft 11, and these are held between the S main body 7 and the 2G frame 10; therefore, the 2G frame 10 is urged toward a film surface in the direction of the optical axis O1 with respect to the S main body 7, and retained so that it may move forward or backward along the optical axis O1.

The 2G frame 10 is provided with a cam follower 10b that is fitted in a 2G frame cam groove 3i of the cam frame 3. Hence, the 2G frame 10 is driven to move forward or backward with respect to the S main body 7 by the rotation of the cam frame 3 while being retained by the S main body 7. The 2G frame cam groove 3i is adjacently connected with a cam groove 3j which is a keyway parallel to the optical axis O1 and which is for retracting the 2G frame. The cam follower 10b moves from the cam groove 3i to the cam groove 3j so that it may be fitted therein.

The setup operation of the zoom lens barrel of the embodiment constituted as set forth above will now be described.

Figure 3:
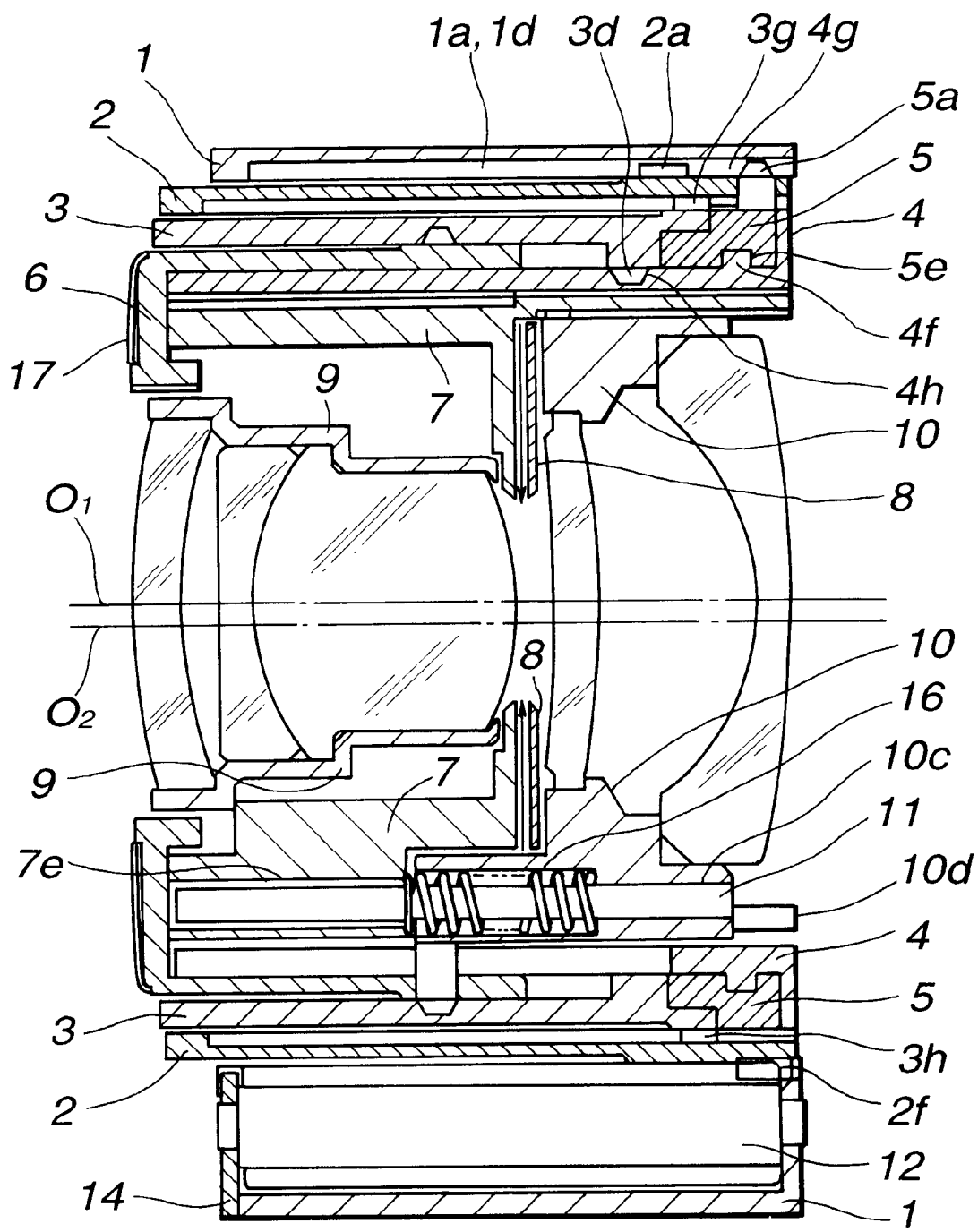
FIG. 3 is a longitudinal sectional view illustrating the zoom lens barrel of the first embodiment when it is in a collapsed state.
Figure 4:
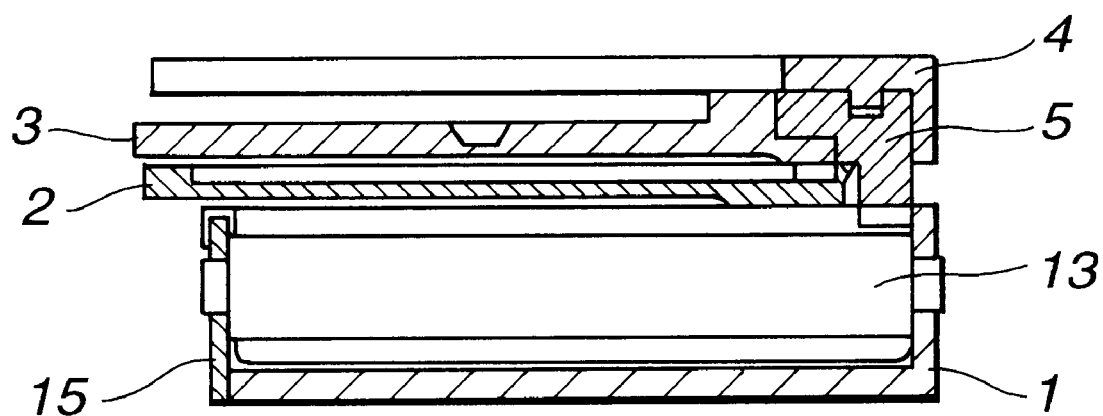
FIG. 4 is a partial sectional view illustrating the portion in the neighborhood of a setting gear assembly of the zoom lens barrel of the first embodiment.
Figure 10:
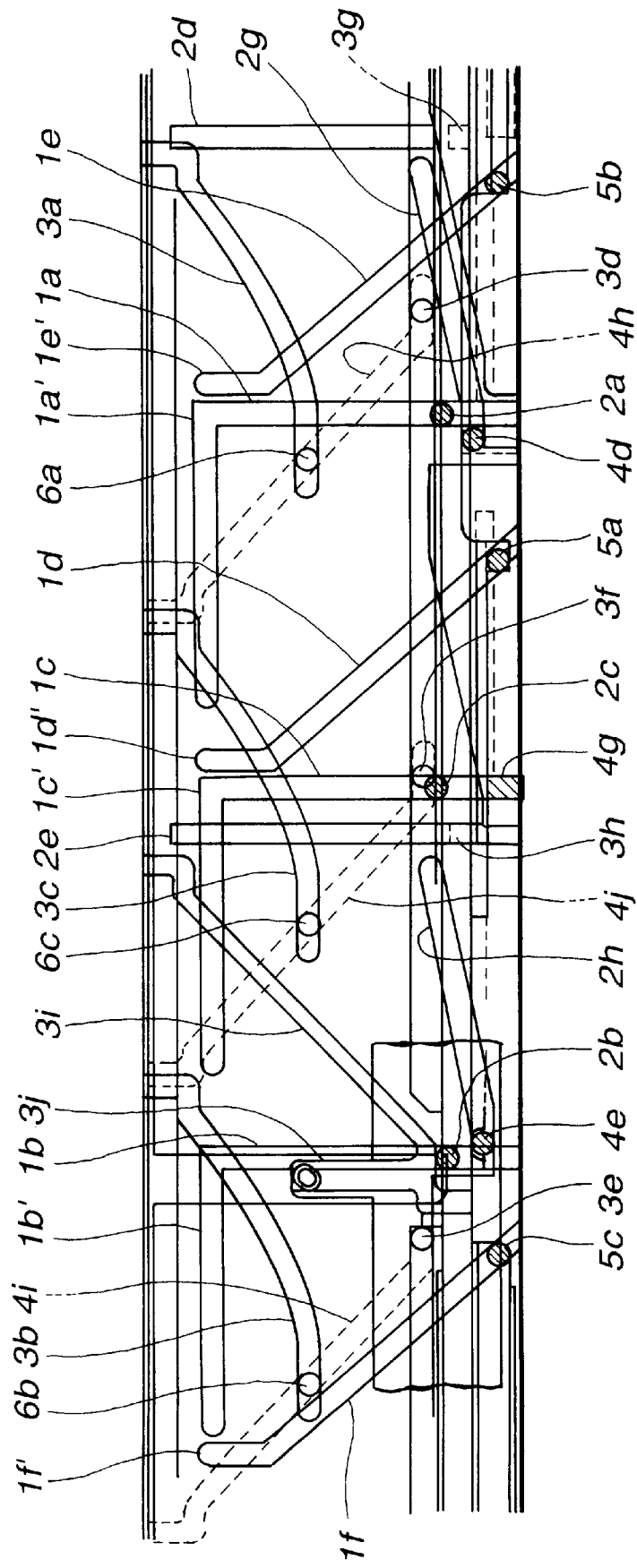
FIG. 10 is a perspective development view of a fixed frame, a moving frame, a cam frame, a float key, and a setting frame of the zoom lens barrel of the first embodiment in the retracted state observed from the inner circumferential side.

It is assumed that the zoom lens barrel is in a retracted state as illustrated in the longitudinal sectional view of FIG. 3 and the development view of FIG. 10. In this state, when the setting gear 13 that is rotatably retained on the fixed frame 1 is turned clockwise as observed from an object side by the driving unit of a camera, the setting frame 5 rotates counterclockwise as observed from the object side since the gear 5d of the setting frame 5 is meshed with the setting gear 13.

The setting frame 5 is engaged with the fixed frame 1, and the cam followers 5a, 5b, and 5c of the setting frame 5 are fitted in the setting frame cams 1d, 1e, and 1f on the inner diameter side of the fixed frame 1. This causes the setting frame 5 to move forward along the optical axis by the cam action effected by the foregoing counterclockwise rotation.

When the setting frame 5 is extended forward, the float key 4, which is rotatably engaged with the setting frame 5 and the rotation of which is restricted with respect to the fixed frame 1, is also extended forward. At this time, the detent key 4g of the float key 4 is fitted in the cam groove 1c of the fixed frame 1, which is a rectilinear key parallel to the optical axis O1 and in which the moving frame cam follower 2c is fitted, so that the float key 4 is extended forward integrally with the setting frame 5 without rotating.

When the float key 4 is extended forward, the moving frame 2 engaged with the cam followers 4d and 4e of the float key 4 is also extended forward. At this time, the cam followers 2a, 2b, and 2c of the moving frame 2 are engaged with the keyways 1a, 1b, and 1c parallel to the optical axis O in the setting region from the collapsed position to the photographing position of the fixed frame 1. Hence, the moving frame 2 is also extended forward integrally with the float key 4 without rotating.

The cam followers 4d and 4e of the float key 4 are fitted in the cam grooves 2g and 2h of the moving frame 2, and the cam followers 3d, 3e, and 3f of the cam frame 3 are fitted in the cam grooves 4h, 4i, and 4j of the float key 4. Hence, the cam frame 3 is extended forward as the float key 4 and the moving frame 2 are extended forward without rotating.

When the cam frame 3 and the float key 4 are extended forward without rotating, the 1Z frame 6 is also extended forward because the cam followers 6a, 6b, and 6c are engaged with the cam grooves 3a, 3b, and 3c of the cam frame 3, and the detent keys 7a, 7b, and 7c of the S main body 7 fixed to the 1Z frame 6 are also fitted in the keyways 4a, 4b, and 4c of the float key 4.

Figure 5:
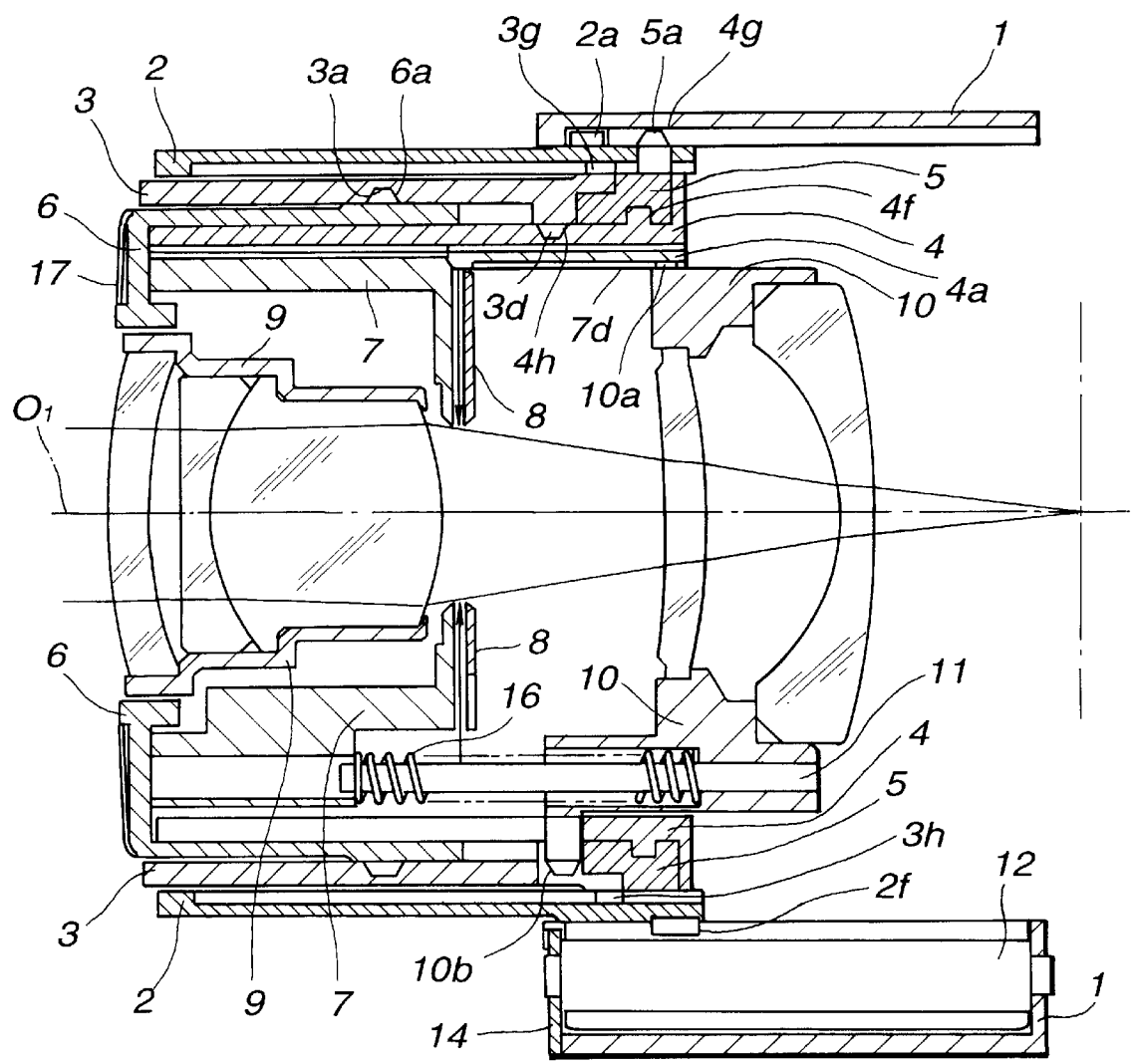
FIG. 5 is a longitudinal sectional view of the zoom lens barrel of the first embodiment when it is in a wide angle state.
Figure 6:
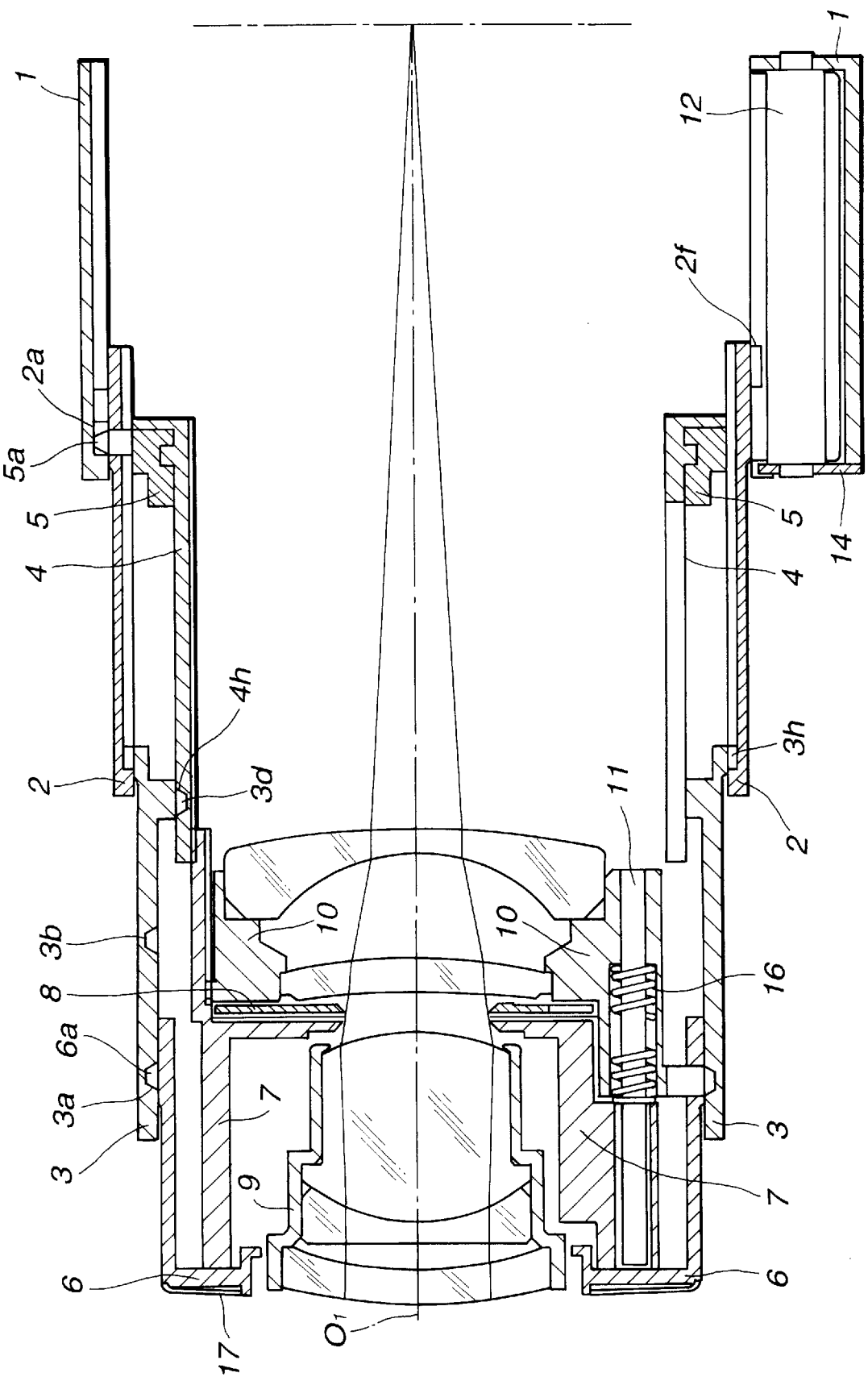
FIG. 6 is a longitudinal sectional view of the zoom lens barrel of the first embodiment when it is in a telephoto angle state.
Figure 7:
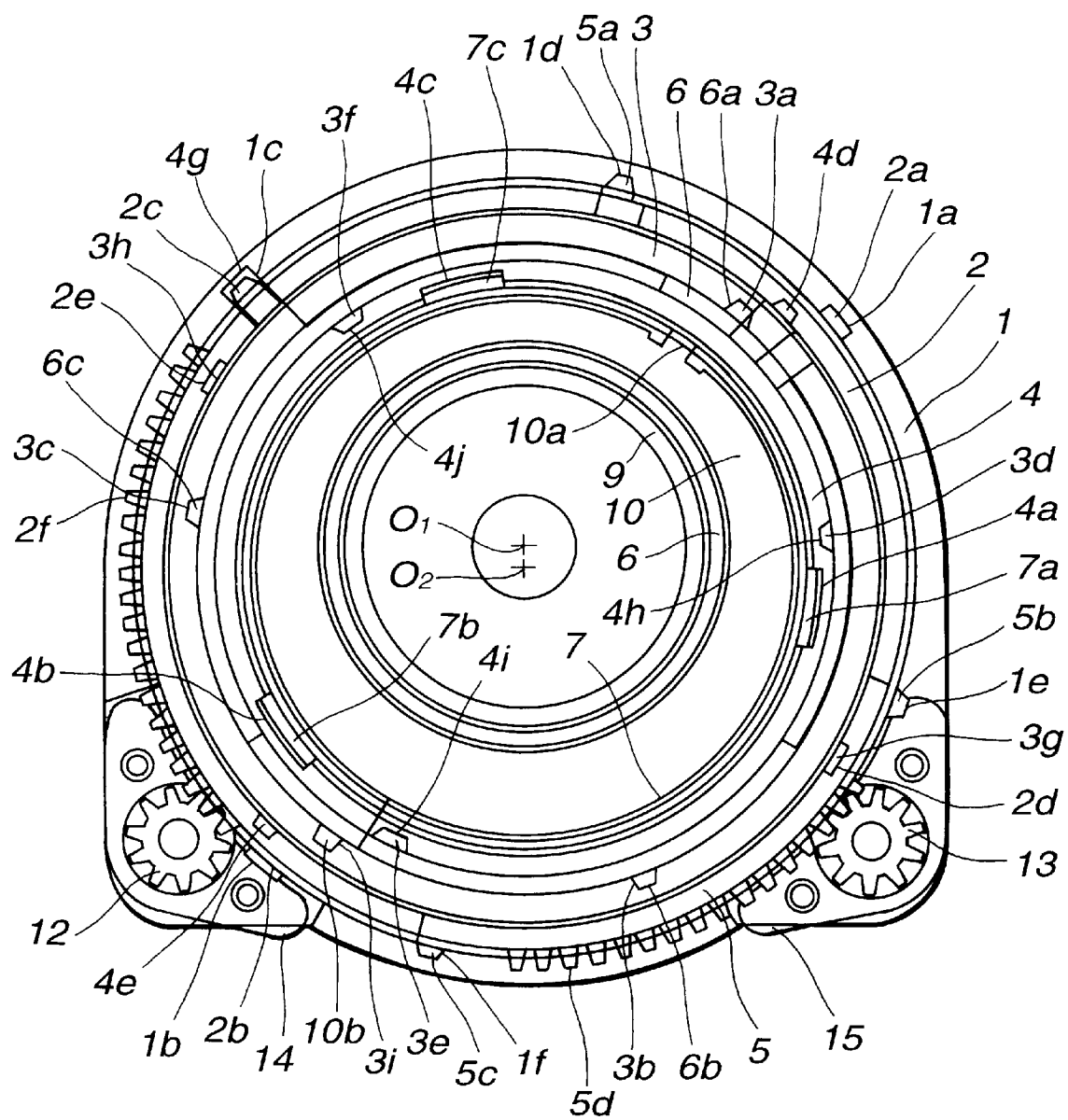
FIG. 7 is a perspective sectional view of the zoom lens barrel of the first embodiment in the collapsed state when it is observed from an object side.
Figure 8:
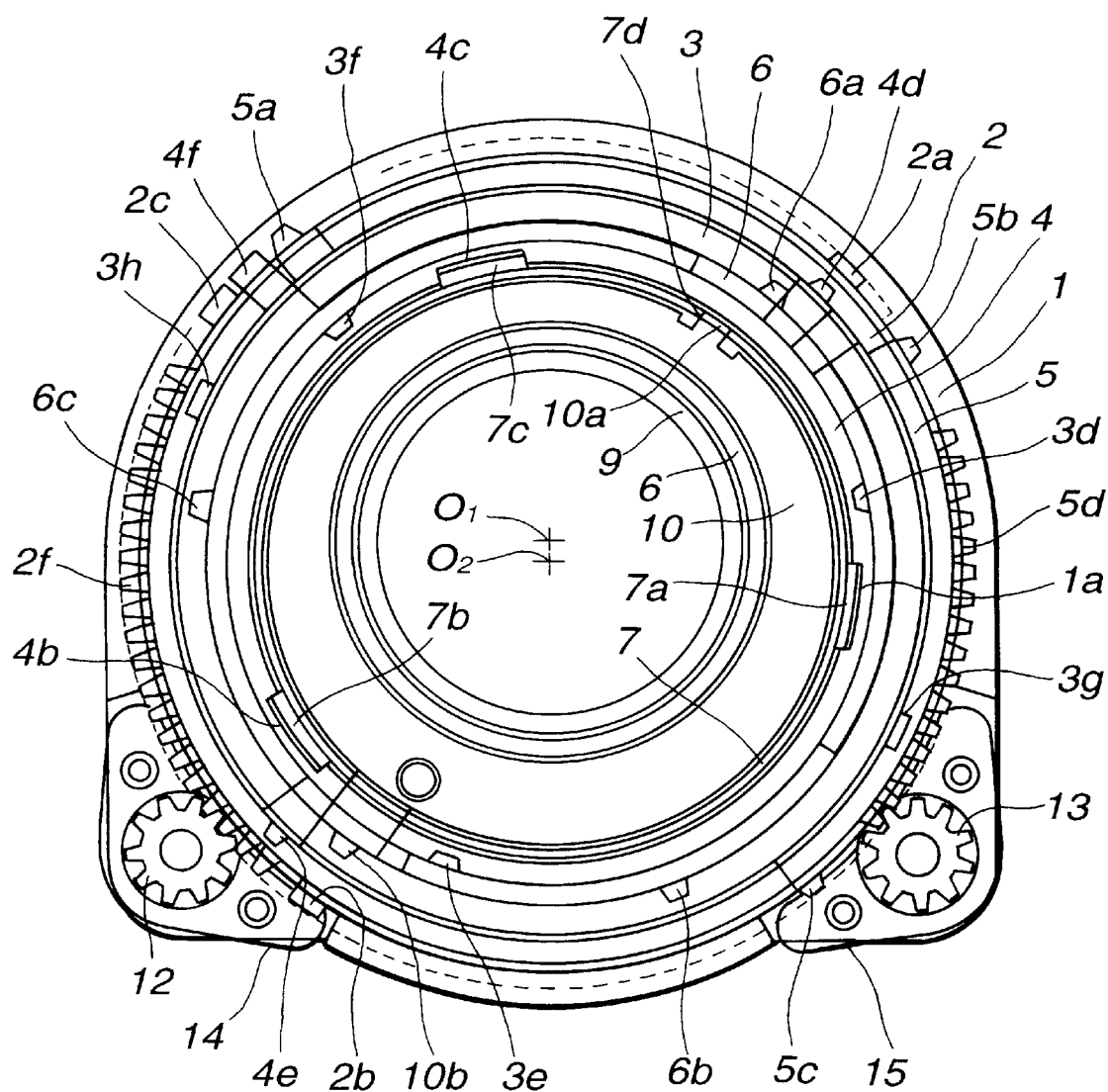
FIG. 8 is a perspective sectional view of the zoom lens barrel of the first embodiment in the wide angle state observed from an object side.
Figure 9:
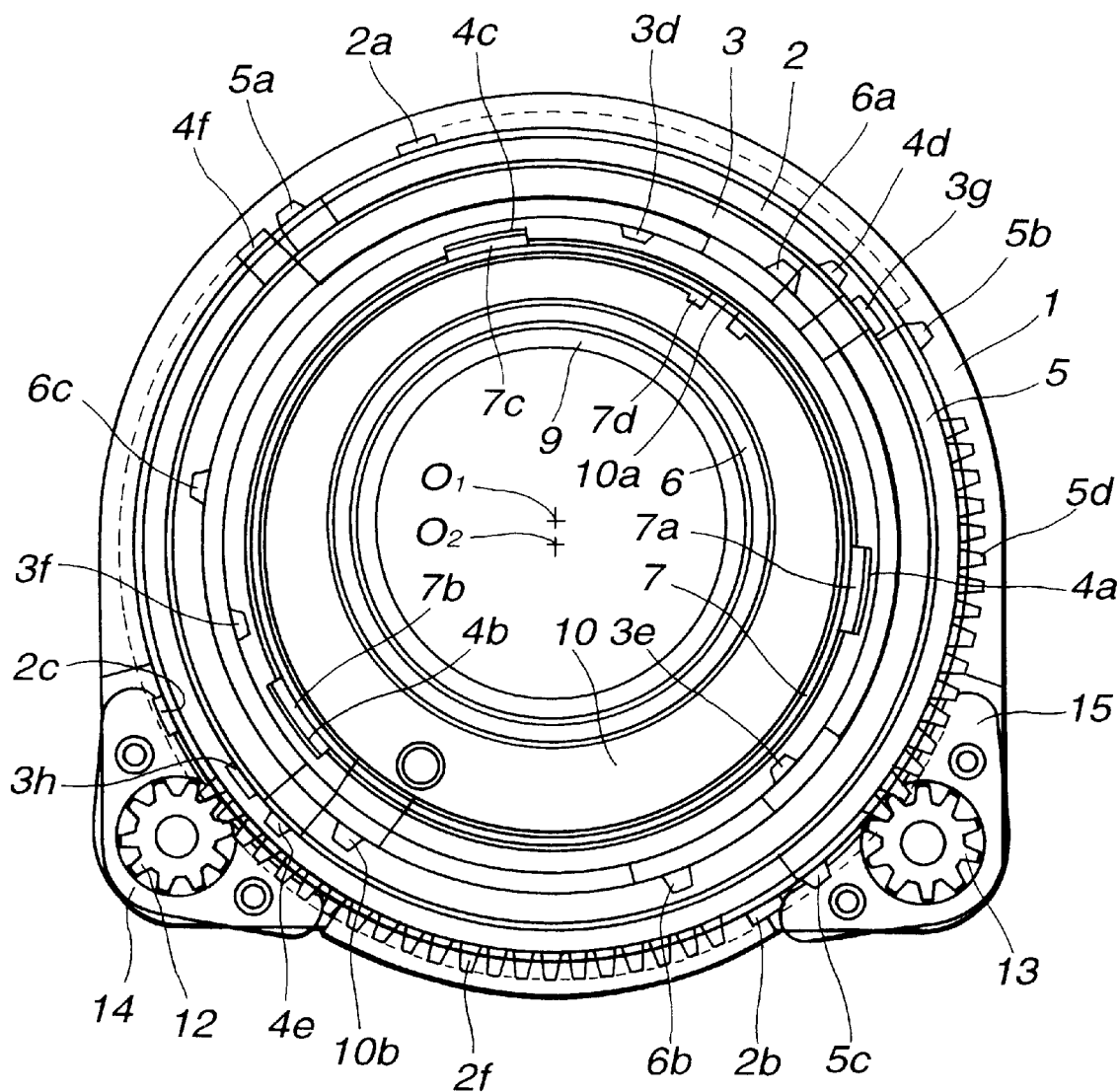
FIG. 9 is a perspective sectional view of the zoom lens barrel of the first embodiment in the telephoto angle state observed from an object side.

When the setting frame 5 is extended forward while rotating under the foregoing condition, the moving frame 2 is also extended forward, causing the cam followers 2a, 2b, and 2c of the moving frame 2 to abut against the ends of the keyways 1a, 1b, and 1c parallel to the optical axis in the setting region of the fixed frame 1. When the operation in which the moving frame 2 is extended along the optical axis under the aforesaid condition, i.e. the setup operation, is completed, the wide angle state in which the moving frame 2 is out in the photographing standby position is obtained. FIG. 5 is a longitudinal sectional view of the zoom lens barrel in the wide angle state following the completion of the setup operation.

The setdown operation is carried out by turning the setting gear 13 retained on the fixed frame 1 counterclockwise as observed from the object side, which is the opposite direction from that in the setup operation. The rotation of the setting gear 13 causes the setting frame 5 to rotate in the opposite direction from that in the setup operation and to be retreated back along the optical axis O1 by the cam action of the fixed frame 1. As in the case of the setup operation, when the setting frame 5 is retracted, the float key 4, the moving frame 2, the cam frame 3, and the 1Z frame 6 are all retracted along the optical axis O1, implementing the collapsed state.

The zoom-in operation and the zoom-out operation of the zoom lens barrel will now be described.

Figure 11:
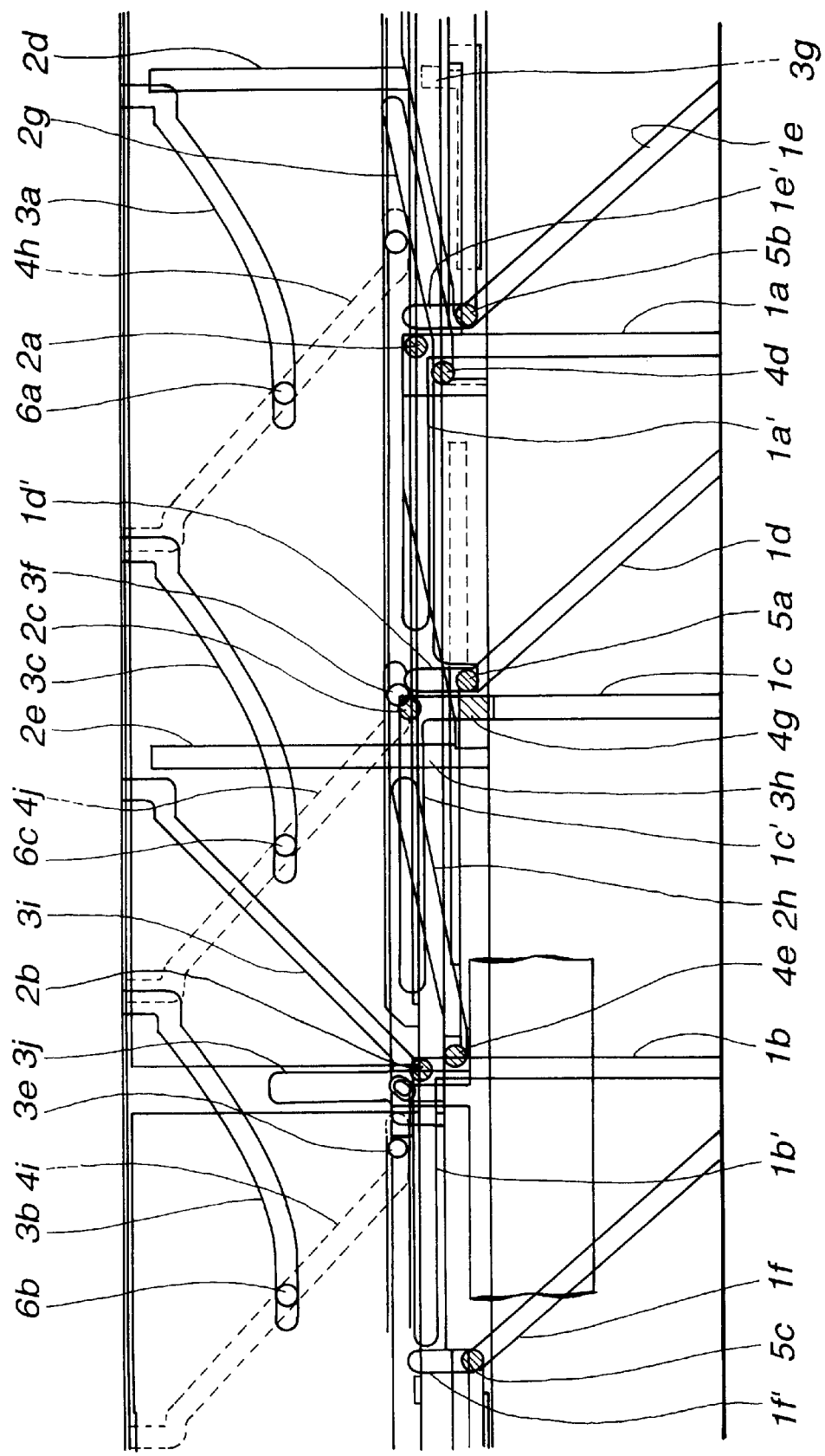
FIG. 11 is a perspective development view of the fixed frame, the moving frame, the cam frame, the float key, and the setting frame of the zoom lens barrel of the first embodiment in the wide angle state and when setup has been completed, the view being observed from the inner circumferential side.

In order to proceed from the state, wherein the moving frame 2, etc. has been extended by the aforesaid setup operation from the collapsed position to the photographing standby position (wide angle) illustrated in the longitudinal sectional view of FIG. 5 and the development view of FIG. 11, to the zoom-in state, the zoom gear 12 retained on the fixed frame 1 is rotationally driven clockwise as observed from the object side by the driving unit of the camera.

In this embodiment, a spur gear that extends in the axial direction by the dimension matching the moving length of the moving frame 2 which moves forward or backward along the optical axis in the setting region is employed for the zoom gear 12 so that the zoom gear 12 is held in engagement with a gear 2*f* of the moving frame 2 during the setting operation as shown in FIG. 5. Alternatively, however, a modification may be employed so that the gear 2*f* of the moving frame 2 meshes with the zoom gear 12 upon completion of the setup operation since the moving frame 2 is extended along the optical axis without rotating during the setup operation. In this case, the zoom gear 12 will be shorter in the axial direction.

In the case of this embodiment, the zoom gear 12 is always in the engagement with the gear 2*f* of the moving frame 2, and the moving frame 2 rotates counterclockwise as the zoom gear 12 rotates in the zoom-up operation. The cam followers 2*a*, 2*b*, and 2*c* of the moving frame 2 shift from the ends of the keyways 1*a*, 1*b*, and 1*c*, which are parallel to the direction of the optical axis O1 and which form the setting region of the fixed frame 1, to the keyways 1*a'*, 1*b'*, and 1*c'* formed along the inner diameter of the fixed frame in the direction perpendicular to the optical axis O1 and are fitted therein. This enables the moving frame 2 to rotate counterclockwise as observed from the object side.

The detent keys 3*g* and 3*h* of the cam frame 3 are fitted in the cam frame detent keyways 2*d* and 2*e* of the moving frame 2, so that the cam frame 3 rotates as the moving frame 2 rotates. Further, the cam followers 4*d* and 4*e* of the float key 4 are fitted in the float key cam grooves 2*g* and 2*h* of moving frame 2, the detent key 4*g* is fitted in the fixed frame 1 and the moving frame keyway 1*c*, and the rotation of the float key 4 is restricted. Therefore, the float key 4 is extended forward along the optical axis O1 by the cam action effected as the moving frame 2 rotates.

The cam followers 3*d*, 3*e*, and 3*f* of the cam frame 3 rotationally driven by the moving frame 2 are fitted in the cam frame cams 4*h*, 4*i*, and 4*j* of the float key 4. Hence, the cam frame 3 is extended forward along the optical axis O1 while rotating with respect to the float key 4 which has its rotation restricted, and it is further extended as the float key 4 itself is extended.

The cam followers 6*a*, 6*b*, and 6*c* of the 1Z frame 6 are fitted in the 1Z frame cam grooves 3*a*, 3*b*, and 3*c* of the cam frame 3, and the detent keys 7*a*, 7*b*, and 7*c* of the S main body 7 that is fixed to the 1Z frame 6 and moves integrally therewith are fitted in the detent keyways 4*a*, 4*b*, and 4*c* of float key 4 which has its rotation restricted. Accordingly, the 1Z frame 6 is extended forward along the optical axis without rotating by the cam action effected by the rotation of the cam frame 3.

The 2G frame 10 serving as the second group lens holding frame is urged to the rear along the optical axis O because the 2G shaft 11 fixed to the 2G frame itself is engaged in the engagement hole 7*e* of the S main body 7 fixed to the 1Z frame 6, and the 2G shaft 11 wrapped with the 2G spring 16 is provided between the 2G frame 10 and the S main body 7.

The cam follower 10*b* of the 2G frame 10 is engaged with the 2G frame cam groove 3*i* of the cam frame 3, and the detent key 10*a* of the 2G frame 10 is engaged with the detent keyway 7*d* of the S main body 7. Hence, the 2G frame 10 is extended along the optical axis relatively in relation to the 1Z frame 6 by the cam action effected by the rotation of the cam frame 3.

As set forth above, the operation in which the 1G frame 9 serving as the first group lens holding frame moving integrally with the 1Z frame 6 with respect to the rotation of the moving frame 2 is extended, and the operation in which the 2G frame 10 serving as the second group lens holding frame is extended as the 1G frame 9 is extended are defined as the zoom-in operation. When the first group lens and the second group lens have been extended to a predetermined telephoto angle position, the rotation of the moving frame 2 is stopped. This completes the zoom-in operation.

The zoom-out operation is performed by rotating the zoom gear 12 in the counterclockwise direction as observed from the object side, which is the opposite direction from that in the zoom-in operation set forth above. When the 1G frame 9 and the 2G frame 10 have been drawn back in, the wide angle state is obtained. When the wide angle position, i.e. the position where the setup operation is completed, is reached, the cam followers 2*a*, 2*b*, and 2*c* of the moving frame 2 abut against the ends of the keyways 1*a'*, 1*b'*, and 1*c'* perpendicular to the optical axis of the fixed frame 1. This completes the zoom-out operation in which the moving frame 2 rotates. To immediately shift to the zoom-in operation, the zoom gear 12 is rotated clockwise as observed from the object side.

To carry out the setdown operation following the zoom-out operation, the setting gear 13 is rotated to rotate the setting frame 5. This causes the setting frame 5 to retract and also the float key 4 and the moving frame 2 to retract. At this time, the cam followers 2*a*, 2*b*, and 2*c* of the moving frame 2 are in the keyways 1*a*, 1*b*, and 1*c* parallel to the optical axis O of the fixed frame 1.

At the time of the setdown operation, the cam follower 10*b* of the 2G frame 10 can be moved into the cam groove 3*j* extending along the optical axis of the cam frame 3. The 2G frame 10 is provided with a retraction stopper 10*d* that juts out backward, and the retraction stopper 10*d* comes in contact with a member of the camera main body at the rear of the lens barrel soon after the 2G frame 10 moves from the setup position toward the collapsed position.

Although the setdown operation is further continued, the 2G frame 10 does not retract since the retraction stopper 10*d* is in contact with the foregoing member of the camera main body. As mentioned above, the cam follower 10*b* of the 2G frame 10 moves into the cam groove 3*j* of the cam frame 3 to compress the 2G spring 16. And the distance between the 1G frame 9 and the 2G frame 10 is gradually decreased. When the position where the setting frame 5 no longer rotates is reached, the retracted state or the setdown state illustrated in FIG. 3 is obtained.

To change from the setup operation over to the zoom-in operation, a detecting means (not shown) is provided to detect that the cam followers 2*a*, 2*b*, and 2*c* of the moving frame 2 have come in contact with the ends of the keyways 1*a*, 1*b*, and 1*c* parallel to the optical axis of the fixed frame 1 when the moving frame 2 is extended forward along the optical axis O in the setup operation. Based on the detection signal issued by the detecting means, the mode, in which the setting gear 13 is driven by the driving unit of the camera, may be changed over to the mode, in which the zoom gear 12 is driven, by a drive switching unit of the camera.

To change from the zoom-out operation over to the setdown operation, a detecting means (not shown) is provided to detect that the cam followers 2*a*, 2*b*, and 2*c* of the moving frame 2 have come in contact with the ends of the keyways 1*a'*, 1*b'*, and 1*c'* perpendicular to the optical axis of the fixed frame 1 when the moving frame 2 is rotated for zooming. Based on the detection signal issued by the detecting means, the mode, in which the zoom gear 12 is driven by the driving unit of the camera, is changed over to the mode, in which the setting gear 13 is driven, by a drive switching unit of the camera.

The gear 5d of the setting frame 5 for setting is substantially flush with the gear 2f of the moving frame 2 for zooming along the optical axis O2; they move together forward or backward along the optical axis O2. To prevent these two gears from interfering with each other when they rotate, it is necessary to secure a space sufficiently large for their rotation.

Accordingly, in this embodiment, the directions of rotation of the foregoing two gears during the setup operation and the zoom-in operation and those during the setdown operation and the zoom-out operation are set to the same. This makes it possible for the gear 2f of the moving frame 2 for zooming in to rotate to move into the space provided when the gear 5d of the setting frame 5 rotates after completion of the setup operation.

Thus, the zoom lens barrel in accordance with this embodiment permits easier changeover between the extending operation in the setup region from the collapsed position to the photographing standby position of a lens holding frame of the lens barrel and the extending operation in the zooming region. The mechanism becomes accordingly simpler in constitution.

Furthermore, the setup operation from the collapsed state is performed by the setting gear separately from the zooming operation in the photographing standby state which is performed by the zoom gear. This leads to reduced load. Moreover, the float key is moved forward or backward by zooming to add to the zooming amount, allowing the total length of the lens barrel in the retracted state to be reduced. In addition, the fixed frame is disposed on the outermost circumference of the lens barrel, so that there is no danger of the leakage of light rays even at the time of setup.

Further, at the time of zooming, the setting frame gear is retracted so that the moving frame gear may become flush with the setting frame gear before rotating. This permits effective use of the space in the barrel of the camera and also permits a reduced total length of the lens barrel in its retracted state.

A zoom lens barrel which is the lens barrel of a second embodiment in accordance with the present invention will now be described.

In the driving system of the zoom lens barrel in the first embodiment set forth above, setting and zooming are respectively performed by two independent driving systems, so that switching between setting and zooming is carried out by selecting either the setting gear 13 or the zoom gear 12 according to the detection signal indicative of the drive state of the lens barrel. More specifically, the detecting means (not shown) detects that the cam followers 2a, 2b, and 2c of the moving frame 2 have come in contact with the ends of the keyways 1a, 1b, and 1c parallel to the optical axis of the fixed frame 1. Then, based on the detection signal issued by the detecting means, the mode, in which the setting gear 13 is driven by the driving unit of the camera, is changed over to the mode in which the zoom gear 12 is driven. This drive mode changeover requires a driving system switching unit built into the camera.

Figure 12:
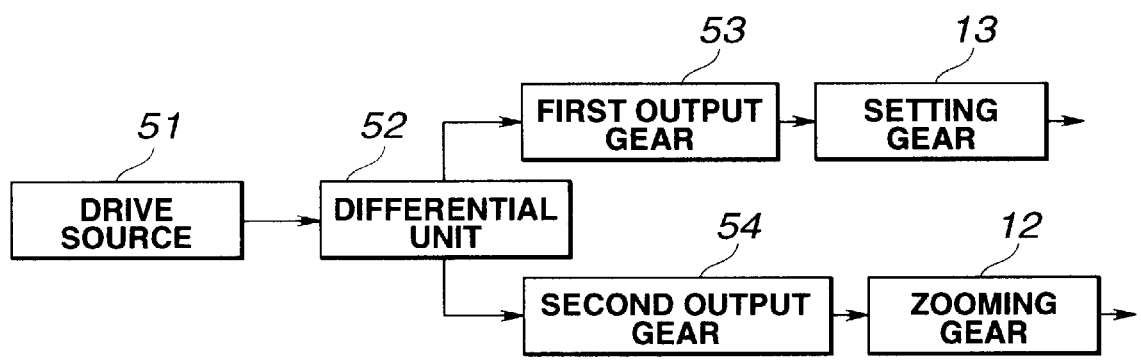
FIG. 12 is a block diagram showing a driving system of a lens barrel of a second embodiment in accordance with the present invention.

A driving system having the constitution shown in the block diagram of the driving system in FIG. 12 is employed as the driving system of the zoom lens barrel in the second embodiment. The driving system corresponds to the driving system of the lens barrel in the first embodiment requiring the driving system changeover unit. More specifically, the driving system in the second embodiment is constituted such that a differential unit 52 which has two differential output shafts is driven by the output of a single drive source 51, and a setting gear 13 or a zoom gear 12 is driven via a first output gear 53 or a second output gear 54 driven by the foregoing output shafts. Either the setting gear 13 or the zoom gear 12, whichever is ready to rotate according to the setting state or the zooming state, is automatically selected and driven. The differential unit 52 is constructed, for example, of planet gears; when the first output gear 53 or the second output gear 54 is placed in a state where the rotation thereof is restricted, only the other output gear is rotated in the forward or reverse direction.

The structure of the zoom lens barrel itself is identical to that shown mainly in FIGS. 1 through 11.

Hence, in the setting state wherein the zoom lens barrel is extended from the retracted state to the wide angle (photographing standby state), the cam followers 2a, 2b, and 2c of the moving frame 2 are held fitted in the rectilinear keyways 1a, 1b, and 1c which form the setting region. Thus, the rotation of the moving frame 2 is prevented, the rotation of the zoom gear 12 joined to the gear 2f of the moving frame 2 is restricted, and only the setting gear 13 can be rotated.

Rotating the setting gear 13 clockwise causes the setting frame 5 to rotate and the moving frame 2 to extend forward along the optical axis, thus completing the setup state or the wide angle state. At this time, the cam followers 5a, 5b, and 5c of the setting frame 5 are held against the cam ends of the cam grooves 1d, 1e, and 1f of the fixed frame 1, so that the setting frame 5 is no longer allowed to rotate, thereby restricting the clockwise rotation of the setting gear 13.

During the zooming performed between the wide angle position and the telephoto angle position, the cam followers 5a, 5b, and 5c of the setting frame 5 move forward or backward integrally with the float key 4 from the ends of the cam grooves 1d, 1e, and 1f of the fixed frame 1 into the keyways 1d', 1e', and 1f' parallel to the optical axis. This prevents the rotation of the setting frame 5 and the rotation of the setting gear 13 is restricted. Upon completion of the setup, the cam followers 2a, 2b, and 2c of the moving frame 2 are fitted in the moving frame keyways 1a', 1b' and 1c' which continue from the ends of the moving frame keyways 1a, 1b and 1c of the fixed frame 1, which are perpendicular to the optical axis, and which form the zooming region. This enables the zoom gear 12 to rotate.

When carrying out the setup procedure under the condition where the setting gear 13 and the zoom gear 12 rotate or the rotation is restricted, and if the lens barrel is in the retracted state, driving the differential unit 52 by the drive source 51 shown in FIG. 1 causes only the setting gear 13 to be rotationally driven by the first output gear 53 to extend the setting frame 5 and the moving frame 2 since the rotation of the zoom gear 12 is prevented as described above.

As soon as the moving frame 2 reaches the photographing standby position, i.e. the wide angle state, upon completion of the setup, the setting gear 13 is put in the state where the rotation thereof is restricted. At the same time, the cam followers 2a, 2b, and 2c of the moving frame 2 are in the keyways 1a', 1b', and 1c' of the fixed frames 1 that are perpendicular to the optical axis O1, so that the zoom gear 12 is ready to rotate. Under this condition, driving the differential unit 52 by the drive source 51 causes only the zoom gear 12 to rotate clockwise for zooming in due to the characteristics of the differential unit.

Similarly, in the zoom-out operation, the cam followers 2a, 2b, and 2c of the moving frame 2 are engaged with the keyways 1a', 1b', and 1c' perpendicular to the optical axis O2 of the fixed frame 1. Therefore, as the zoom gear 12 rotates counterclockwise, the moving frame 2 moves for zooming out. The zooming out is ended when the cam followers 2a, 2b, and 2c of the moving frame 2 come in contact with the ends of the keyways 1a', 1b', and 1c' of the fixed frame 1 and stop.

The setdown operation following the zoom-out operation will now be described. During the zooming, the cam followers 5a, 5b, and 5c of the setting frame 5 are engaged with the keyways 1d', 1e', and 1f' parallel to the optical axis of the fixed frame 1, so that the rotation of the setting gear 13 is prevented. After the completion of the zooming, however, the setting gear 13 can rotate because the cam followers 5a, 5b, and 5c of the setting frame 5 fit in the setting frame cams 1d, 1e, and 1f of the fixed frame 1. At the same time, the zoom gear 12 is prevented from rotating.

As set forth above, with the rotation of the zoom gear 12 restricted, the setting gear 13 rotates due to the characteristics of the differential unit 52. The setting frame 5 rotates because the setting gear 13 is joined with the gear 5d of the setting frame 5. The cam followers 5a, 5b, and 5c of the setting frame 5 move into the cam grooves 1d, 1e, and 1f of the fixed frame 1 as previously mentioned, causing the setting frame 5 to retract along the optical axis by the cam action thereby to implement the setdown operation.

Thus, the use of the differential unit of the zoom lens barrel of the second embodiment obviates the need of the unit for switching between the camera driving systems as in the case of the first embodiment, achieving a simpler drive control. In addition, more effective use of the space in a camera is possible, greatly contributing to a reduced size of the camera.

What is claimed is:

1. A lens barrel of a photographing optical system, which lens barrel is moved forward or backward between a collapsed position, where said lens barrel is retracted in relation to a camera main body, and a photographing standby position, where said lens barrel is extended forward from said collapsed position, said lens barrel comprising:

a setting frame which rotates substantially around an optical axis of said photographing optical system to move said photographing optical system between said collapsed position and said photographing standby position;

a moving frame which rotates substantially around the optical axis of said photographing optical system to move said photographing optical system so as to change a focal length thereof;

a setting gear which meshes with a gear assembly provided on said setting frame to rotate said setting frame; and a zoom gear which meshes with a gear assembly provided on said moving frame to rotate said moving frame.

2. A lens barrel comprising:

a fixed frame;

a moving frame which is driven forward or backward along an optical axis during a setting operation performed from a collapsed position to a photographing standby position, and which is rotationally driven to change a focal length when it is located in said photographing standby position;

a setting frame which is provided so that it may rotate in either direction with respect to said moving frame and move integrally with said moving frame along said optical axis, and which moves along said optical axis while rotating by a cam provided on said fixed frame from said collapsed position to said photographing standby position;

a setting gear which meshes with a gear assembly provided on said setting frame to drive said setting frame; and a zoom gear which meshes with a gear assembly provided on said moving frame to drive said moving frame.

3. A lens barrel comprising:

a fixed frame;

a moving frame which is driven forward or backward along an optical axis during a setting operation performed from a collapsed position to a photographing standby position, and which is rotationally driven to change a focal length when it is in said photographing standby position;

a float key which engages said fixed frame, and which is restricted in its rotation around said optical axis, and which is movable along said optical axis;

a cam frame which is rotated integrally with said moving frame with respect to said fixed frame and which can be moved forward or backward along said optical axis with respect to said moving frame;

a first lens holding frame, the rotation of which is restricted with respect to said float key, and which is movable forward or backward along said optical axis, and which is driven along said optical axis with respect to said fixed frame by the rotation of said cam frame; and a second lens holding frame which is supported to that it may be relatively moved in a straight line along said optical axis with respect to said first lens holding frame.

4. A lens barrel of a photographing optical system according to claim 1, wherein:

said lens barrel has a fixed frame, and said setting gear and said zoom gear are rotatably provided on said fixed frame.

5. A lens barrel according to claim 2, wherein:

said gear assembly of said moving frame is displaced from said zoom gear when said setting frame is in the collapsed position and meshes with said zoom gear when said setting frame moves from said collapsed position to said photographing standby position.

6. A lens barrel according to claim 2, wherein:

said setting gear for driving said setting frame stays meshed with said gear assembly of said setting frame at all times, and said zoom gear for driving said moving frame also stays meshed with said gear assembly provided on said moving frame at all times.

7. A lens barrel according to claim 2, wherein said fixed frame has:

first cam means for moving said setting frame; and second cam means which is formed so that it restricts the rotation of said moving frame and allows said moving frame to move forward or backward along said optical axis over a distance between said collapsed position and said photographing standby position, and that it restricts the forward or backward movement of said moving frame along said optical axis but allows the rotation thereof after the photographing standby position is reached.

8. A lens barrel according to claim 3, wherein:

said float key is moved forward or backward along said optical axis by cam means provided on said moving frame when said focal length is changed.

9. A lens barrel according to claim 3, wherein:

said cam frame is moved forward or backward along said optical axis by cam means provided on said float key when said focal length is changed.

10. A lens barrel of a photographing optical system, which lens barrel involves a setting operation in which said lens barrel is moved between a collapsed position, where said lens barrel is retracted with respect to a camera main body, and a photographing standby position, where said lens barrel is extended forward from said collapsed position and a zooming operation in which a focal length is changed at said photographing standby position, said lens barrel comprising:

a setting frame supported such that it may move along an optical axis while rotating substantially around said optical axis of said photographing optical system so as to perform a setting operation;

a moving frame which can be rotated substantially around said optical axis of said photographing optical system and which has a setting region, in which it moves along said optical axis with its rotation restricted, and a zooming region, in which it rotates with its forward or backward movement along said optical axis restricted;

a setting gear which meshes with said setting frame to rotationally drive said setting frame; and a zoom gear which meshes with said moving frame to rotationally drive said moving frame;

wherein, when said setting frame is rotated by said setting gear, said moving frame moves integrally with said setting frame in said setting region as said setting frame moves along said optical axis so as to perform said setting operation, and when said moving frame is rotated by said zoom gear, said moving frame moves in said zooming region to perform said zooming operation.

11. A lens barrel of a photographing optical system according to claim 10, wherein said setting region and said zooming region are joined.

12. A lens barrel of a photographing optical system according to claim 1 or 10, wherein:

said setting gear and said zoom gear have rotating shafts thereof disposed substantially parallel to said optical axis and respectively extend axially to match the moving length of said setting region.

13. A lens barrel of a photographing optical system according to claim 12, wherein:

said setting gear is constantly meshed with said setting frame which moves along said optical axis while rotating, and said zoom gear is constantly meshed with said moving frame which moves along said optical axis.

14. A lens barrel of a photographing optical system according to claim 10, further comprising:

a single drive source; and a differential gear unit that has two differential output shafts joined to said setting gear and said zoom gear, respectively, and that drives either said setting gear or said zoom gear, whichever is free to rotate is automatically selected, using the power supplied from said single drive source;

wherein, when said drive source is actuated and if said moving frame is in said setting region, then the power of said drive source is transmitted only to said setting gear by said differential gear unit because the rotation of said moving frame meshed with said zoom gear is restricted, or if said moving frame is in said zooming region, then the power of said drive source is transmitted only to said zoom gear by said differential gear unit because said moving frame which moves integrally with said setting frame meshed with said setting gear has restricted forward or backward movement along said optical axis.

15. A lens barrel of a photographing optical system according to claim 14, wherein:

continued drive of said drive source in one direction automatically changes said setting operation over to said zooming operation, while continued drive of said drive source in the other direction automatically changes said zooming operation over to said setting operation.

16. A lens barrel of a photographing optical system according to claim 12, further comprising a fixed frame which is fixed in relation to said setting frame and said moving frame which are movable along said optical axis;

wherein said setting gear and said zoom gear are rotatably provided on said fixed frame.

17. A lens barrel of a photographing optical system according to claim 12, further comprising:

a gear assembly provided on said setting frame such that it meshes with said setting gear; and a gear assembly provided on said moving frame such that it meshes with said zoom gear;

wherein said gear assembly of said moving frame and said gear assembly of said setting frame share a partial area of a circumferential region which corresponds to a rotating track thereof.

18. A lens barrel of a photographing optical system according to claim 17, wherein:

said gear assembly of said moving frame that has rotated at the time of said zooming operation enters said partial area before said setting operation, said partial area being produced when said gear assembly of said setting frame rotates for retraction by said setting operation, so that said setting frame and said moving frame do not interfere with each other when they rotate.

19. A lens barrel of a photographing optical system, which lens barrel involves a setting operation performed between a collapsed position, where said lens barrel is retracted in relation to a camera main body, and a photographing standby position, where said lens barrel is extended forward from said collapsed position, and a zooming operation in which a focal length is changed at said photographing standby position, said lens barrel comprising:

a fixed frame;

a moving frame which can be moved forward or backward along an optical axis with the rotation thereof restricted and also rotated with said forward or backward movement along said optical axis restricted in relation to said fixed frame;

a float key which is guided by said fixed frame so as to move in a straight line along said optical axis, and which moves forward or backward along said optical axis integrally with said moving frame during said forward or backward movement of said moving frame, and which is driven along the optical axis when said moving frame rotates;

a setting frame supported such that is free to rotate in either direction with respect to said float key and driven forward or backward integrally with said float key along said optical axis;

a setting gear which meshes with said setting frame to rotationally drive said setting frame; and a zoom gear which meshes with said moving frame to rotationally drive said moving frame;

wherein, if said setting frame is rotated by said setting gear, then said moving frame is moved forward or backward integrally with said setting frame between said collapsed position and said photographing standby position to carry out said setting operation, or if said moving frame is rotated by said zoom gear, then said zooming operation is carried out.

20. A lens barrel of a photographing optical system according to claim 19, further comprising:

a setting region cam which is formed on said fixed frame so as to engage a cam follower provided on said moving frame and which is aligned parallel to said optical axis to guide said moving frame along said optical axis with the rotation thereof restricted;

a zooming region cam which is formed to continue from said setting region cam and which is aligned substantially perpendicularly to said optical axis to guide said moving frame in rotation with the forward or backward movement along said optical axis restricted; and a setting frame cam which is provided on said fixed frame so as to engage a cam follower provided on said setting frame and which guides said setting frame so that said setting frame moves forward or backward along said optical axis while rotating.

21. A lens barrel of a photographing optical system according to claim 19, further comprising:

a cam frame constituted such that it is rotated integrally with said moving frame in relation to said fixed frame and movable forward or backward along said optical axis in relation to said moving frame;

a first lens holding frame which can be moved forward or backward, with the rotation thereof restricted, along said optical axis in relation to said float key, and which is driven along said optical axis in relation to said fixed frame by the rotation of said cam frame; and a second lens holding frame which is supported so that it may be relatively moved in a straight line along said optical axis in relation to said first lens holding frame.

22. A lens barrel of a photographing optical system according to claim 19, further comprising:

a rectilinear guide provided on said moving frame and parallel to said optical axis;

a cam frame which has an engaging portion mating with said rectilinear guide provided on said moving frame, which rotates integrally with said moving frame in relation to said fixed frame and can be moved forward or backward along said optical axis in relation to said moving frame, and which has a first cam and a second cam formed on the circumference thereof;

a rectilinear guide provided on said float key parallel to said optical axis;

a first lens holding frame which has an engaging portion mating with a rectilinear guide provided on said float key, which can be moved forward or backward, with the rotation thereof restricted, along said optical axis in relation to said float key, which has a cam follower engaging said first cam, and which is driven along said optical axis in relation to said fixed frame by the rotation of said cam frame; and a second lens holding frame which is supported to that it may be relatively moved in a straight line along said optical axis in relation to said first lens holding frame, which has a cam follower engaging said second cam, and which is driven along said optical axis in relation to said fixed frame by the rotation of said cam frame.

23. A photographing lens barrel which is placed in a housed position in a non-photographing mode, and is extended to a photographing standby position in a photographing mode, said lens barrel comprising:

a photographing optical system having an optical axis thereof;

a first gear having a length extending along said optical axis;

a second gear having a length extending along said optical axis;

a first frame member which has a gear assembly constantly meshed with said first gear, which rotates as said first gear rotates, and which also moves along said optical axis to move said photographing optical system from said housed position to said photographing standby position along said optical axis; and a second frame member which has a gear constantly meshed with said second gear, and which rotates as said second gear rotates to further move said photographing optical system along said optical axis to extend it to said photographing standby position after said first frame member moves along said optical axis and the movement of said first frame member along said optical axis stops.

24. A photographing lens barrel which is placed in a housed position in a non-photographing mode, and is extended to a photographing standby position in a photographing mode, said lens barrel comprising:

a photographing optical system having an optical axis thereof;

a first gear having a length extending along said optical axis;

a second gear having a length extending along said optical axis;

a single drive source which rotationally drives said first and second gears;

a driving force transmitting unit which is able to transmit the driving force of said single drive source to said first and second gears and which is able to drive one of said two gears even if the other gear is forcibly stopped;

a first frame member which has a gear assembly constantly meshed with said first gear, which rotates as said first gear rotates, and which also moves along said optical axis to move said photographing optical system from a housed position to said photographing standby position along said optical axis; and a second frame member which has a gear constantly meshed with said second gear, and which rotates as said second gear rotates to further move said photographing optical system along said optical axis to extend it to said photographing standby position after said first frame member moves along said optical axis and the movement of said first frame member along said optical axis stops;

wherein, said second gear is forcibly prevented from rotating while said first frame member is moving, but said second gear is allowed to rotate whereas said first gear is forcibly prevented from rotating when said first frame member stops moving.

* * * * *

UNITED STATES PATENT AND TRADEMARK OFFICE
CERTIFICATE OF CORRECTION

PATENT NO. : 5,983,033  
DATED : November 9, 1999  
INVENTOR(S) : Yamazaki et al.

Page 1 of 1

It is certified that error appears in the above-identified patent and that said Letters Patent is hereby corrected as shown below:

<u>Column 3,</u>
Line 9, delete "drive n" and insert therefor -- driven --.

Signed and Sealed this

Twenty-ninth Day of January, 2002

Attest:

Attesting Officer

JAMES E. ROGAN
*Director of the United States Patent and Trademark Office*